(12) United States Patent
Hyde et al.

(10) Patent No.: US 9,002,484 B2
(45) Date of Patent: Apr. 7, 2015

(54) SYSTEM AND METHOD FOR DEFORMING SURFACES

(75) Inventors: Roderick A. Hyde, Redmond, WA (US); Nathan P. Myhrvold, Medina, WA (US); Lowell L. Wood, Jr., Bellevue, WA (US); Alistair K. Chan, Stillwater, MN (US); Clarence T. Tegreene, Bellevue, WA (US)

(73) Assignee: The Invention Science Fund I LLC

( * ) Notice: Subject to any disclaimer, the term of this patent is extended or adjusted under 35 U.S.C. 154(b) by 2169 days.

(21) Appl. No.: 11/633,145

(22) Filed: Dec. 1, 2006

(65) Prior Publication Data

US 2008/0128560 A1    Jun. 5, 2008

(51) Int. Cl.
| G05B 13/02 | (2006.01) |
| B64C 23/00 | (2006.01) |
| B64C 21/10 | (2006.01) |
| F15D 1/12 | (2006.01) |

(52) U.S. Cl.
CPC .............. B64C 23/005 (2013.01); B64C 21/10 (2013.01); F15D 1/12 (2013.01); *Y02T 50/166* (2013.01); *B64C 2230/26* (2013.01)

(58) Field of Classification Search
USPC .......... 700/47; 114/67 R; 244/130, 201, 204; 72/378
See application file for complete search history.

(56) References Cited

U.S. PATENT DOCUMENTS

| 2,440,198 A | 4/1948 | Green |
| 3,289,978 A | 12/1966 | Banaszak |
| 3,578,264 A | 5/1971 | Kuethe |
| 4,309,901 A | 1/1982 | Rolinski et al. |
| 4,526,031 A | 7/1985 | Weisend, Jr. et al. |
| 4,611,492 A | 9/1986 | Koosmann |
| 5,359,574 A | 10/1994 | Nadolink |
| 5,365,490 A | 11/1994 | Katz |
| 5,369,345 A | 11/1994 | Phan et al. |
| 5,374,011 A | 12/1994 | Lazarus et al. |
| 5,531,407 A | 7/1996 | Austin et al. |
| 5,540,406 A | 7/1996 | Occhipinti |
| 5,558,156 A | 9/1996 | Tsutsui |
| 5,558,304 A | 9/1996 | Adams |
| 5,755,408 A | 5/1998 | Schmidt et al. |
| 5,808,210 A | 9/1998 | Herb et al. |
| 5,874,671 A | 2/1999 | Lopez |

(Continued)

FOREIGN PATENT DOCUMENTS

WO    WO 2006040532 A1 *    4/2006

OTHER PUBLICATIONS

Alnajjar, E.; Naguib, A.M.; Christophorou, C.; "Receptivity of High-Speed Jets to Excitation Using an Array of MEMS-Based Mechanical Actuators"; Proc. ASME Fluids Engineering Division Summer Meeting; bearing dates of Jun. 22-26, 1997 and 1997; pp. 1-6; Paper No. FEDSM97-3224; Vancouver, B.C.

(Continued)

*Primary Examiner* — Mohammad Ali
*Assistant Examiner* — Sheela S Rao

(57) ABSTRACT

A system and method is described generally for producing surface deformations on a surface of a body. The system and method relate to a first surface being a surface of the body exposed to the fluid flow and at least one actuator affecting deformation of the first surface. A control system providing control commands to the at least one actuator is provided and a sensor providing environmental characteristic information to the control system is also provided.

1 Claim, 16 Drawing Sheets

(56) References Cited

U.S. PATENT DOCUMENTS

| | | | |
|---|---|---|---|
| 5,942,682 A | 8/1999 | Ghetzler et al. | |
| 5,953,773 A | 9/1999 | Asada et al. | |
| 5,957,413 A | 9/1999 | Glezer et al. | |
| 5,961,080 A * | 10/1999 | Sinha | 244/204 |
| 5,988,568 A | 11/1999 | Drews | |
| 6,016,286 A | 1/2000 | Olivier et al. | |
| 6,109,565 A | 8/2000 | King, Sr. | |
| 6,123,145 A | 9/2000 | Glezer et al. | |
| 6,332,593 B1 * | 12/2001 | Kamiadakis et al. | 244/204 |
| 6,484,971 B2 | 11/2002 | Layukallo | |
| 6,644,598 B2 | 11/2003 | Glezer et al. | |
| 6,662,647 B2 | 12/2003 | Schoess et al. | |
| 6,795,763 B2 | 9/2004 | Yao et al. | |
| 6,821,090 B1 | 11/2004 | Hassan et al. | |
| 6,862,502 B2 * | 3/2005 | Peltz et al. | 701/19 |
| 6,871,816 B2 | 3/2005 | Nugent et al. | |
| 6,874,748 B2 | 4/2005 | Hanagan | |
| 6,966,231 B2 | 11/2005 | Sheplak et al. | |
| 6,979,050 B2 | 12/2005 | Browne et al. | |
| 7,031,871 B2 | 4/2006 | Severson et al. | |
| 7,133,785 B2 | 11/2006 | Larson et al. | |
| 7,204,731 B2 | 4/2007 | Gusler | |
| 7,251,592 B1 | 7/2007 | Praisner et al. | |
| 7,375,911 B1 | 5/2008 | Li et al. | |
| 7,703,839 B2 | 4/2010 | McKnight et al. | |
| 7,854,467 B2 | 12/2010 | McKnight et al. | |
| 7,913,928 B2 | 3/2011 | Tiliakos et al. | |
| 2002/0131474 A1 | 9/2002 | Suga | |
| 2004/0197519 A1 | 10/2004 | Elzey et al. | |
| 2005/0121240 A1 | 6/2005 | Aase et al. | |
| 2006/0022092 A1 * | 2/2006 | Miller et al. | 244/200.1 |
| 2006/0040532 A1 | 2/2006 | Ozawa et al. | |
| 2006/0236777 A1 * | 10/2006 | Chambers et al. | 73/801 |
| 2007/0113932 A1 | 5/2007 | Tiliakos et al. | |
| 2008/0128027 A1 | 6/2008 | Hyde et al. | |
| 2008/0128560 A1 | 6/2008 | Hyde et al. | |
| 2008/0128561 A1 | 6/2008 | Hyde et al. | |
| 2008/0193307 A1 | 8/2008 | Elata et al. | |

OTHER PUBLICATIONS

Du, Yiqing; Symeonidis, V.; Karniadakis, G.E.; "Drag reduction in wall-bounded turbulence via a transverse travelling wave"; J. Fluid Mech.; bearing a date of 2002; pp. 1-34; vol. 457; Cambridge University Press.

Grosjean, C.; Lee, G.B.; Hong, W.; Tai, Y.C.; Ho, C.M.; "Micro Balloon Actuators for Aerodynamic Control"; Proc. 11 Annual Int. Workshop on Micro Electro Mechanical Systems (MEMS '98); Jan. 25-29, 1998; pp. 1-6; Heidelberg, Germany.

Huang, A.; Ho, C.M.; Jiang, F.; Tai, Y.C.; "MEMS Transducers for Aerodynamics—A Paradigm Shift"; AIAA 38$^{th}$ Aerospace Sciences Meeting and Exhibit; bearing a date of Jan. 10-13, 2000; pp. 1-8; AIAA Paper No. 00-0249; Reno, NV.

Kang, S.; Choi, H.; "Active Wall Motions for Skin-Friction Drag Reduction"; Physics of Fluids; bearing a date of Dec. 2000, pp. 3301-3304; vol. 12, No. 12.

Karniadakis, G.E.; Choi, Kwing-So; "Mechanisms on Transverse Motions in Turbulent Wall Flows"; Annu. Rev. Fluid Mech.; bearing a date of 2003; pp. 45-62, total pages 24; vol. 35; Annual Reviews.

Lee, G.B.; Ho, C.M.; Jiang, F.; Liu, C.; Tsao, T.; Tai, Y.C.; Scheuer, F.; "Control of Roll Moment by MEMS"; ASME MEMS; 1996; pp. 1-7.

Naguib, A.; Christophorou, C.; Alnajjar, E.; Nagib, H.; "Array of MEMS-Based Actuators for Control of Supersonic Jet Screech"; AIAA Summer Fluid Mechanics Meeting; bearing a date of 1997; pp. 1-9; AIAA Paper No. 97-1963; Snowmass, CO.

Shen, Lian; Zhang, Xiang; Yue, Dick K. P.; Triantafyllou, Michael S.; "Turbulent flow over a flexible wall undergoing a streamwise travelling wave motion"; J. Fluid Mech.; bearing a date of 2003; pp. 197-221; vol. 484; Cambridge University Press.

Tsao, Thomas; Jiang, Fukang; Miller, Raanan; Tai, Yu-Chong; Gupta, Bhusan; Goodman, Rodney; Tung, Steve; Ho, Chih-Ming; "An Integrated MEMS System for Turbulent Boundary Layer Control"; Technical Digest(Transducers '97); pp. 1-4; vol. 1.

Tsao, Thomas; Liu, Chang; Tai, Yu-Chung; Ho, Chih-Ming; "Micromachined Magnetic Actuator for Active Fluid Control"; Application of Microfabrication to Fluid Mechanics; 1994; pp. 1-8; vol. 197; ASME.

Yang, X.; Tai, Y.C.; Ho, C.M.; "Micro Bellow Actuators"; Technical Digest (Transducers '97); 1997; pp. 1-4; vol. 1.

Wang, C.Y.; "Flow over a surface with parallel grooves"; Physics of Fluids; bearing a date of May 2003; pp. 1114-1121; vol. 15, No. 5; American Institute of Physics.

Zhao, H.; Wu, J.-Z.; Luo, J.-S.; "Turbulent drag reduction by traveling wave of flexible wall"; bearing dates of 2003 and 2004; pp. 175-198; vol. 34; The Japan Society of Fluid Mechanics and Elsevier B.V.

PCT International Search Report; International App. No. PCT/US07/024570; Sep. 8, 2008; pp. 1-2.

UK Intellectual Property Office Examination Report Under Section 18(3); App. No. GB0911332.5; Jan. 31, 2011 (received by our agent Feb. 3, 2011); 4 pages.

UK Intellectual Property Office Examination Report Under Section 18(3); App. No. GB0911333.3; Oct. 25, 2010; pp. 1-2.

* cited by examiner

———————————————— FIG. 9A

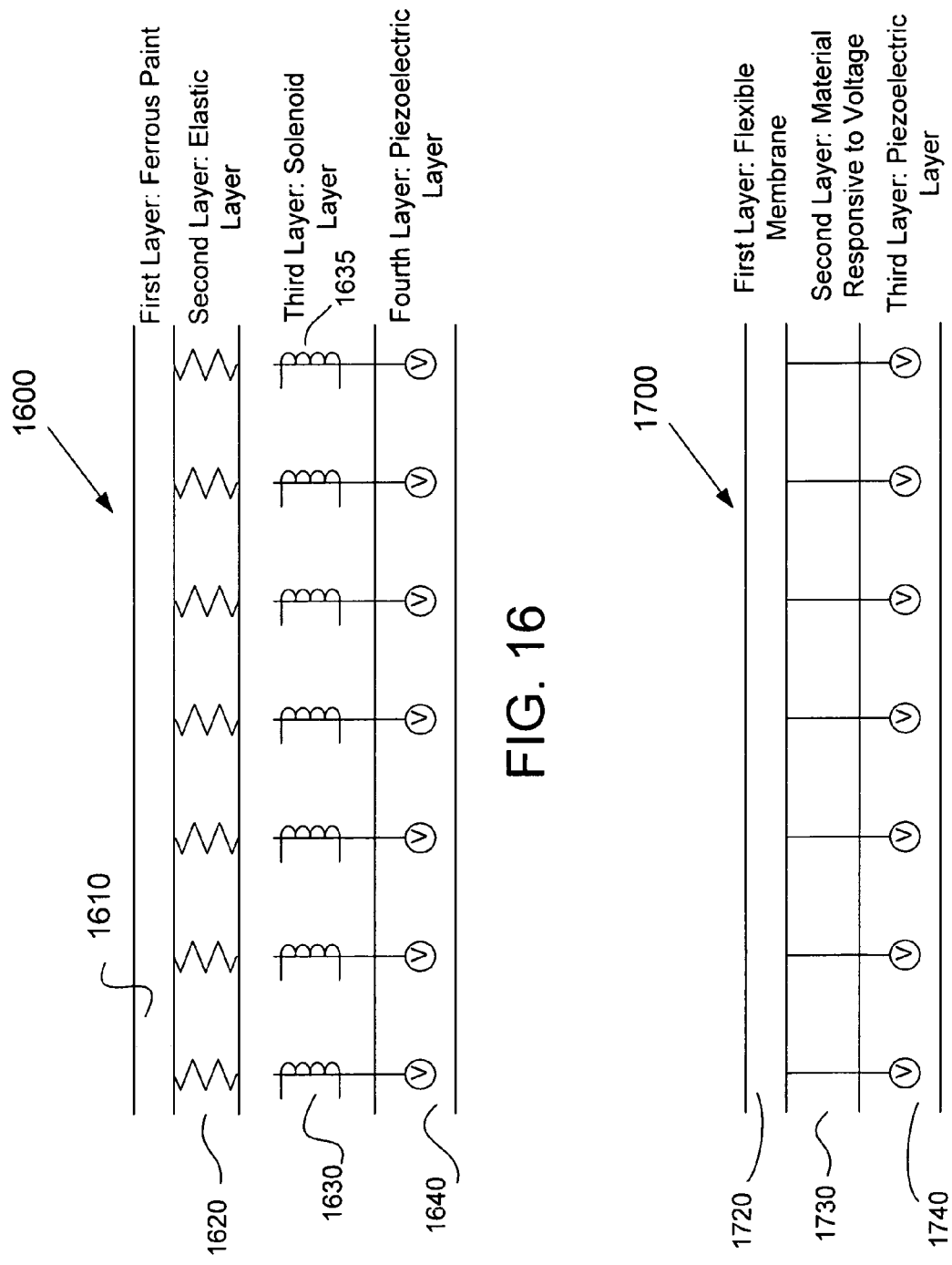

SYSTEM AND METHOD FOR DEFORMING SURFACES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

1. For purposes of the USPTO extra-statutory requirements, the present application constitutes a continuation in part of currently co-pending U.S. patent application entitled ACTIVE CONTROL OF A BODY BY ALTERING SURFACE DRAG, naming Roderick A. Hyde, Nathan P. Myhrvold, Lowell L. Wood, Jr., Alistair K. Chan, and Clarence T. Tegreene as inventors, U.S. application Ser. No. 11/633,083, filed Dec. 1, 2006.

2. For purposes of the USPTO extra-statutory requirements, the present application constitutes a continuation in part of currently co-pending U.S. patent application entitled SYSTEM AND METHOD FOR CHANGING THE CONVECTIVE HEAT TRANSFER OF A SURFACE, naming Roderick A. Hyde, Nathan P. Myhrvold, Lowell L. Wood, Jr., Alistair K. Chan, and Clarence T. Tegreene as inventors, U.S. application Ser. No. 11/633,082, filed Dec. 1, 2006.

3. For purposes of the USPTO extra-statutory requirements, the present application constitutes a continuation in part of currently co-pending U.S. patent application entitled ACTIVE CONTROL OF SURFACE DRAG, naming Roderick A. Hyde, Nathan P. Myhrvold, Lowell L. Wood, Jr., Alistair K. Chan, and Clarence T. Tegreene as inventors, U.S. application Ser. No. 11/633,143, filed Dec. 1, 2006.

BACKGROUND

The description herein generally relates to the field of vehicles utilizing thrust and experiencing drag traveling through an environmental media, and more particularly the modification of thrust, turbulence and drag. More generally the description relates to the active deformation of a surface to alter the characteristics of the surface to flow or surface to surface interface, by creating a dynamically changing surface geometry on one or more surfaces of a body to control motion of the body.

SUMMARY

In one aspect, a method for determining control commands for a surface deformation system, includes receiving data from the at least one sensor associated with at least one of a body, environmental conditions, or a surface of the body, the surface having at least one actuator for deforming the surface. The method also includes correlating the at least one sensor data to desired actuation schemes when the surface is exposed to varying environmental conditions.

In another aspect a method for determining control commands or parameter changes for a surface deformation system, includes providing a surface on a body having at least one actuator for deforming the surface and at least one sensor associated with at least one of the surface, the environmental conditions, or the body. The method includes placing the body in an environment in which the surface is exposed to varying environmental conditions. The method also includes receiving data from the at least one sensor. Further, the method includes correlating the sensor data to desired actuation schemes or parameter changes when the surface is exposed to varying environmental conditions.

In yet another aspect, a method of controlling resonance of a body, is disclosed. The method includes providing at least one deformable surface of the body. The method also includes generating a sensor signal by at least one sensor associated with the body. Further, the method includes determining the onset of resonance of at least a portion of the body. Further still, the method includes generating an actuation signal by at least one actuator associated with the surface for selectively deforming the surface. Yet further still, the method includes deforming the surface of the body to cancel or induce the resonance of the at least one portion of the body by changing forces on the surface of the body due to the deformation of the surface.

In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a fluid flow alteration system.

In another aspect a system for controlling resonance of a body, is disclosed. The system comprises at least one deformable surface of the body. The system comprises at least one sensor associated with the body. The system also comprises at least one actuator associated with the surface for selectively deforming the surface. Further, the system comprises a processor configured to determine the onset of resonance of at least a portion of the body and deforming the surface of the body to cancel or induce the resonance of the at least one portion of the body by changing forces on the surface of the body due to the deformation of the surface.

In another aspect, a system for producing surface deformations on a surface of a body includes a first surface being a surface of the body exposed to the fluid flow the first surface being defined by at least two orthogonal directions. The system also includes at least one actuator affecting deformation of the first surface in at least two orthogonal directions. Further, the system a includes a control system providing control commands to the at least one actuator and at least one sensor providing environmental characteristic information to the control system.

In yet another aspect an active deformable surface includes a deformable layer defined by at least two orthogonal directions and an actuator layer causing deformation of the deformable layer in at least two orthogonal directions. The surface also includes a signal generation system providing inputs to the actuator layer based on information from at least one sensor.

In still yet another aspect a surface deformation system includes actuators configured to produce a plurality of displacements of a surface associated with the actuators. The system also includes at least one controller in communication with the actuators, the at least one controller configured to activate the actuators according to command signals produced by the at least one controller, the actuators causing deformation of the surface to alter the surface interface with a medium in at least partial contact with the surface.

In still a further aspect, a system for determining control commands or parameter changes for a surface deformation system includes a surface on a body having at least one actuator for deforming the surface and at least one sensor associated with at least one of the surface, environmental conditions, or the body. The system also includes a data collection system for receiving data from the at least one sensor, the data collection system configured to collect sensor data and correlate the sensor data to desired actuation schemes or parameter changes when the surface is exposed to varying environmental conditions.

In still yet a further aspect, a system for controlling resonance of a body includes at least one deformable surface of the body, at least one sensor associated with the body, and at least one actuator associated with the surface for selectively deforming the surface. The system also includes a processor configured to determine the onset of resonance of at least a portion of the body and configured to cause deformation of the surface of the body to modify the resonance of the at least one portion of the body by changing forces on the surface of the body due to the deformation of the surface by commanding the at least one actuator.

In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The foregoing summary is illustrative only and is not intended to be in any way limiting. In addition to the illustrative aspects, embodiments, and features described above, further aspects, embodiments, and features will become apparent by reference to the drawings and the following detailed description, of which:

FIGS. 9A-E are exemplary diagrams of a deformable surface having various traveling surface waves.

FIG. 16 is an exemplary diagram of an active skin system having a ferrous layer and a solenoid layer.

FIG. 17 is an exemplary diagram of an active skin system having a flexible layer and a responsive layer.

DETAILED DESCRIPTION

Figure 1:
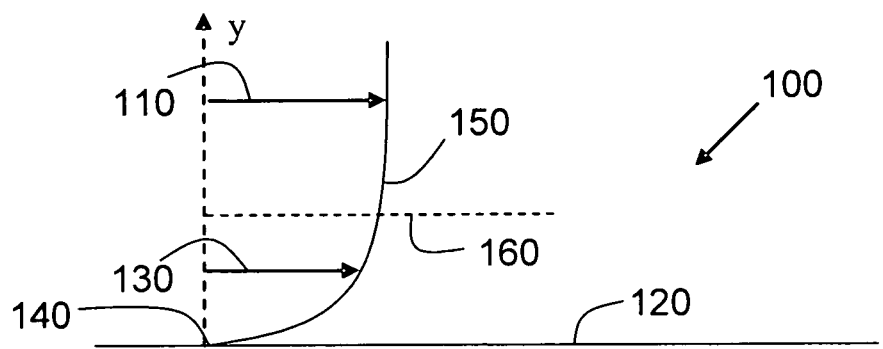
FIG. 1 is an exemplary diagram of a velocity profile of fluid flow over a flat plate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Air acts as a viscous fluid at sub-sonic speeds, any object moving through it collects a group of air particles which it tends to pulls along with it. Air particles close to the surface of the object tend to move with approximately the same relative velocity as the object due to viscous adhesion. As a flat plate, airfoil, or other object moves through a free stream of air at a given velocity, viscous adhesion causes a very thin layer of air having relative velocities below that of the relative free stream velocity, to form adjacent the object surface. This layer, known as the "boundary layer", constitutes the interface between the airfoil and its surrounding air mass. Although many of the concepts described are being described with reference to air as being the fluid medium, it should be noted that the scope is not so limited and that any of a variety of fluids may be equally as applicable within the context of the description and claims.

Figure 2:
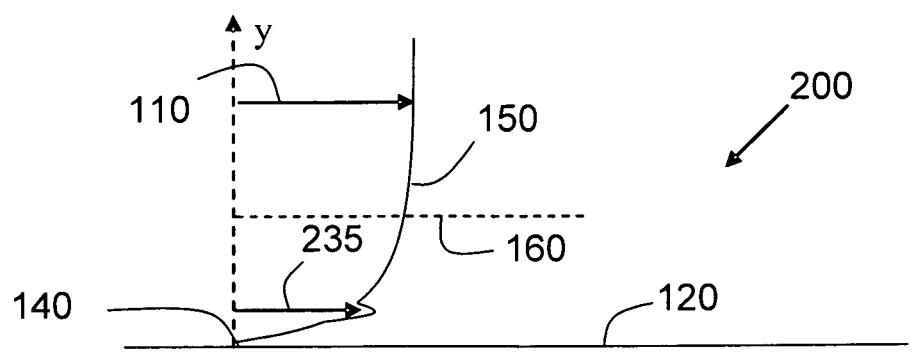
FIG. 2 is an exemplary diagram of a velocity profile of fluid flow over a flat plate in which horizontal velocity has been added within the boundary region.
Figure 3:
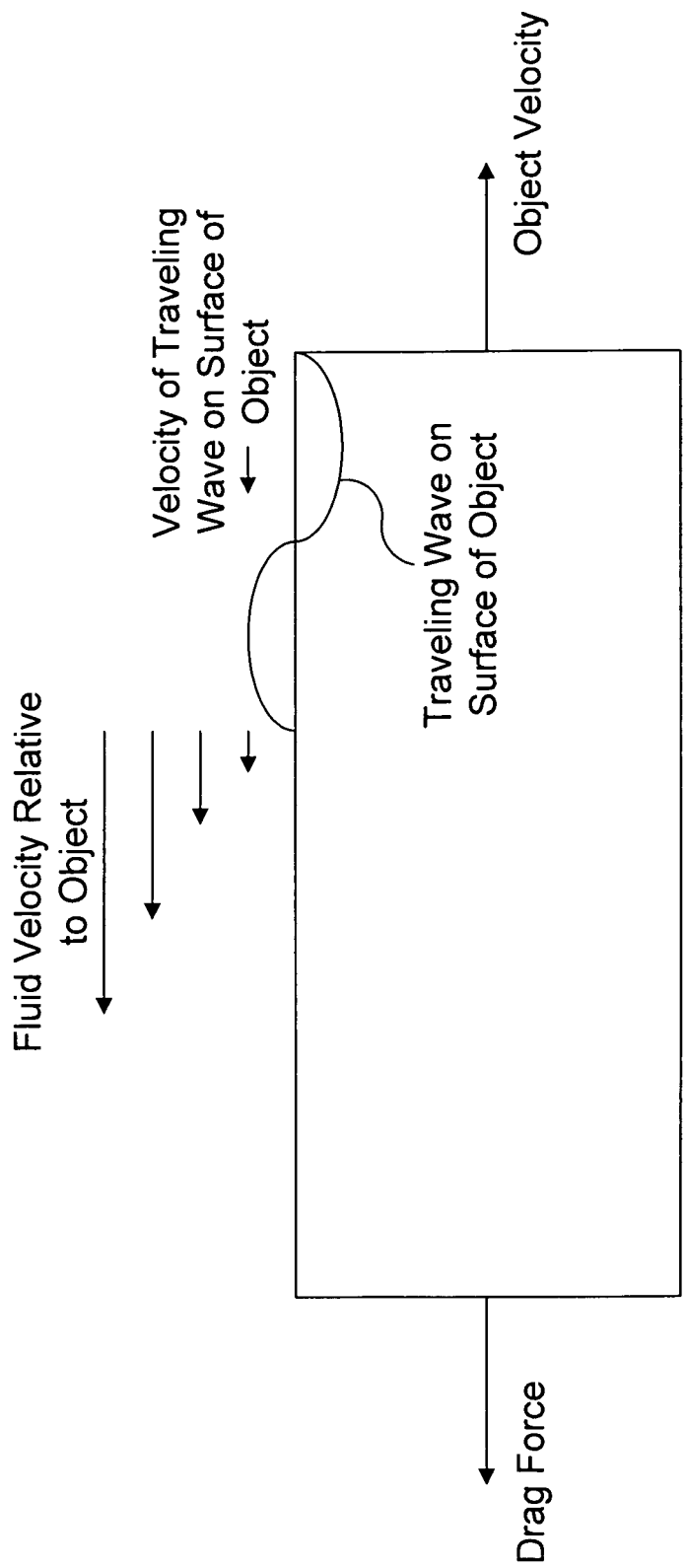
FIG. 3 is an exemplary diagram of a traveling surface wave on an object in the presence of a fluid flow.

Referring now to FIG. 1, a fluid flow state 100 over a flat plate 120 is depicted. Flat plate 120 is provided as an example only, any of a variety of surfaces including curved or discontinuous surfaces may be equally applicable. A "y" coordinate is oriented perpendicular to flat plate 120. In a conventional laminar flow the relative 130 of the fluid (e.g. gas, liquid, solid suspension that behaves like a liquid) near flat plate 120, is less than the relative velocity 110 of the fluid away from flat plate 120, with the relative velocity 140 at the surface of flat plate 120 typically having a relative velocity value of zero. A zero relative velocity refers to no relative velocity with respect to a reference frame, in this example the surface of the flat plate. The continuum of relative velocities traces a relative velocity profile 150. The position 160 where the relative velocity approaches the free stream velocity is typically referred to as the outer limit of the boundary layer. The drag force on the object is related to the integrated difference between the free stream velocity 110 and the relative velocities in the boundary region defined by velocity profile 150 and outer limit of the boundary layer 160. Referring now to FIG. 2, a fluid flow state 200 is depicted, where a horizontal velocity 235 has been added within the boundary region. The integrated difference between the freestream velocity 110 and the relative velocities within boundary layer 160 is therefore reduced, which has the effect of reducing drag. The increased relative velocity 235 may be induced by providing motions of the object's surface. Such motions may be in the form of traveling surface waves, surface displacements, surface deformations, and the like (See FIG. 3). Systems and methods discussed herein may provide such induced increases in relative velocity of boundary layer flow to aid in reducing drag. Conversely, by using surface waves, displacements, and/or deformations to induce decreased relative flow velocities, increases in drag for purposes of braking and/or control may be advantageously and selectively generated.

Figure 4:
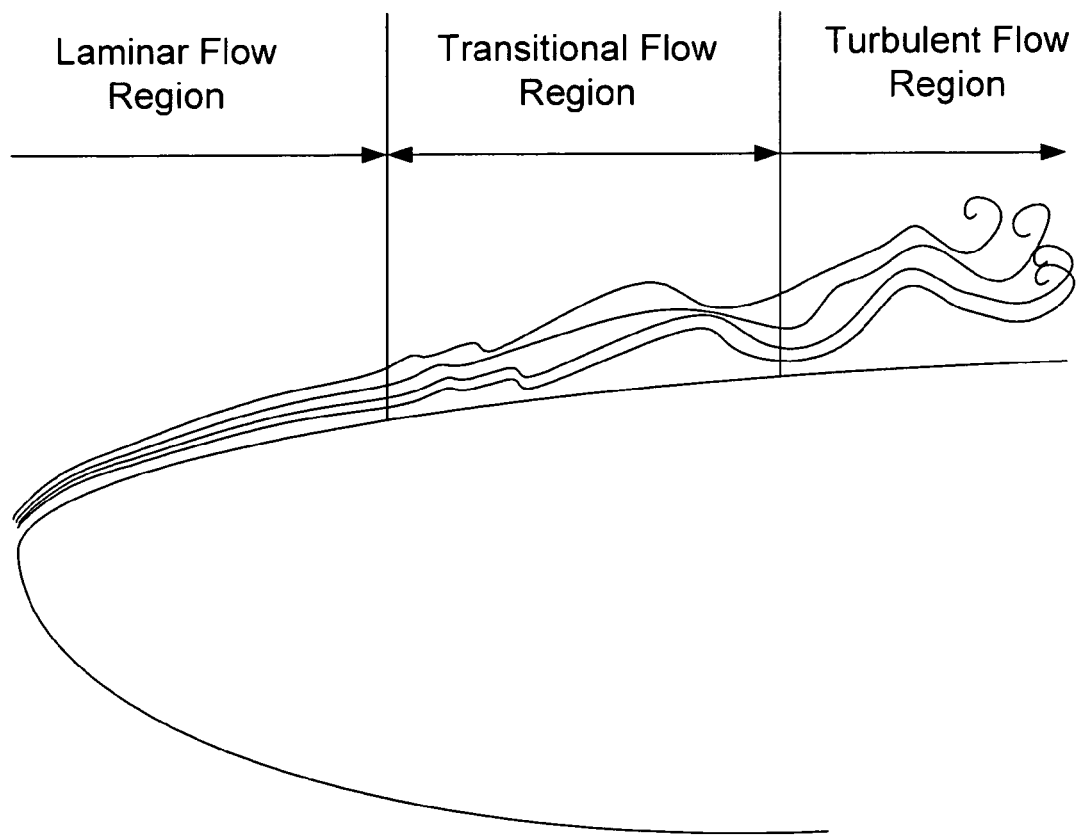
FIG. 4 is an exemplary diagram of laminar and turbulent flow characteristics.

Another manner in which to alter the drag on an object may be to retard the onset of turbulent flow around the object. Conceptually, the boundary layer may be simply thought of as the layer of air surrounding an object in which the relative velocity of the layer of molecules closest to the object is at or near zero, and in which the relative velocity at successively distant points from the object increases until it approaches that of the free stream, at which point the outer limit of the boundary layer is reached. Generally, boundary layers may be characterized as laminar or turbulent, although there is a region of transition between laminar and turbulent that may, in some cases, be quite large, as depicted in FIG. 4. The laminar flow region is characterized by smooth flow that is free from eddies. The turbulent flow region is characterized by a thicker boundary layer that has a large number of eddies that act to transfer momentum from the faster moving outer portions to the relatively slower portions nearer the airfoil surface. Thus, a turbulent boundary layer produces a greater amount of surface friction, than does a laminar boundary layer. The increase in surface friction causes increased aerodynamic drag that requires greater power consumption to maintain constant airfoil speed.

It should also be noted here that increases in drag will correspondingly cause an increase in the rate of heat transfer to the surface due to the increase of surface friction (skin friction). In other words, an increase in the skin friction coefficient will correspondingly increase the convective heat transfer coefficient. Conversely, a decrease in skin friction will decrease the rate of heat transfer to the surface. Accordingly, in accordance with an exemplary embodiment, it may be desirable to modulate the skin friction in order to control the heat transfer characteristics of the fluid/surface interface.

A laminar boundary layer will, in many conditions, form at or near the leading edge of a conventional airfoil (for example) and extend rearward toward the points of minimum pressure on the upper and lower surfaces. According to Bernoulli's principle, the region between the leading edge and the first minimum pressure point is one of a decreasing pressure gradient. Thereafter, the pressure gradient will increase and the relatively low kinetic energy of the air molecules closest to the airfoil surface may be insufficient to maintain laminar flow against the gradient. In this event it is possible that small perturbations in the boundary layer will develop into eddies that initiate a transition from laminar to turbulent flow. Alternatively, in the presence of higher pressure gradients, the molecules closest to the airfoil surface may actually reverse their direction of motion and begin to move upstream, thereby causing the boundary layer to separate from the airfoil surface. This condition causes significantly more drag, and less lift, than a turbulent boundary layer, and reattachment will not normally occur unless some means is employed to reenergize the boundary layer. Thus, it is advantageous to control the boundary layer of an object in order to reduce aerodynamic drag and the energy losses associated therewith.

One such method of controlling the boundary layer is to provide traveling surface waves, surface displacements, and/or surface deformations which can be used to alter the transition from laminar to turbulent flow and/or prevent the onset of boundary layer separation near the object. Altering the transition from laminar flow to turbulent flow in aerodynamic boundary layers on the surfaces of objects and/or preventing boundary layer separation near the object is another important manner to reduce aerodynamic drag, and hence reduce energy consumption for propelling the object and/or provide control of motions of the object. Alternatively, surface waves, deformations, and or displacements may be used to selectively increase drag by inducing turbulent flow earlier and/or inducing boundary layer separation.

As alluded to above, it may be desirable to increase drag on an object, for example if the object is a vehicle it may be desirable to increase drag during vehicle braking. While some aircraft, for example, have movable control surfaces that increase drag and lift, movable control surfaces on other vehicles such as automobiles or boats may not be as practical. Increases in aerodynamic drag may also be used for steering the vehicle, for example by causing increased drag on one wing of an aircraft, the increased drag may cause the aircraft to turn due to differential aerodynamic forces on different portions of the aircraft body. Similarly, by reducing drag on one body surface, the differential aerodynamic forces on the body may cause the body to change direction (i.e., may induce a torque on the body).

Another fluid flow state around an object, that may be desirable to control by providing surface waves, deformations, and/or displacements, is supercavitation. Supercavitation occurs when an object moving through a fluid reaches a certain speed. For example, for an object moving through water, supercavitation may occur when the object moves in excess of 100 knots. At this speed it is possible for a bubble of air to form around the object, beginning at the nose of the object. The bubble can extend completely around the entire object and hence the object is no longer moving through the water, rather the object is moving through air. This results in a significantly reduced amount of friction or drag because of the reduced density of the fluid. Hence, by inducing motions on the object surface it may be possible to induce the onset of supercavitation at lower speeds of the object itself.

Aircraft, other vehicles and any of a variety of objects moving through a fluid may often experience crosswinds that are tangential winds that have various lift and drag effects. In other words, the relative wind being experienced by an object is not typically directed parallel to the velocity vector of the object. These so called crosswinds may results in difficulty in controlling the flight of an aircraft, for example, and in providing a comfortable environment for aircraft passengers. Further, many solutions to decreasing drag do not contemplate crosswinds but rather have been designed using the assumption that the relative wind vector is parallel to the velocity vector of the object. Thus, by providing complex surface waves, deformations, and/or displacements, which may propagate in directions which are not necessarily parallel or perpendicular to the velocity vector of the object, it may be possible to counteract the crosswind effect, or use the crosswinds advantageously to selectively decrease drag, and/or to selectively increase drag. Further, because crosswinds may cause differential forces or torque on an aircraft or other body, it may be desirable to control surface drag on different surfaces of the body in order to balance forces on the body such that the resultant torque is either zero or is of a desired magnitude and direction for causing substantially predictable motion of the body.

Yet another flow state that may affect one or more objects moving relative to a fluid is the creation of a slipstream. A slipstream is the turbulent flow of air or water driven backwards for example by propellers of a craft. A slipstream may also be the area of reduced pressure or forward suction produced immediately behind a fast moving object as it moves through the air or water, for example an aircraft. There are a number of ways to affect the slipstream boundary layer or laminar airflow layer either in front or behind the vehicle in order to decrease the turbulence or flow. For example, if three vehicles are traveling together in a slipstream, with one following another one, all three vehicles will travel faster. Thus, it may be desirable to improve the slipstream effect and further to facilitate a vehicle traveling in the slipstream. For example, it may be desirable to improve the slipstream characteristics of a bicycle rider on a racing team. In certain situations a cyclist may wish to have a teammate use the slipstream advantageously so that the teammate does not have to use as much energy to follow the lead cyclist. In other situations, a lead cyclist may wish to disrupt the slipstream so that a cyclist from another team may not use the slipstream created by the lead cyclist to their advantage. Scenarios such as this may be envisioned in a variety of sports, such as but not limited to car racing, boat racing, aircraft racing, speed skating, etc. For the cyclist, it may be advantageous to cause traveling waves or other surface deformations on the surface of the cyclist's clothing and/or bicycle, in order to advantageously affect the characteristics of the slipstream.

In a more critical application, it has long been known that a turbulent slipstream may cause difficulties for one aircraft following another, causing stalling or other undesirable situations. This is particularly true at airport locations in which multiple aircraft are put in queue as they approach the runway for landing. The FAA has long had certain minimum following distances for different types of aircraft because of the magnitude and problems associated with the slipstream. Thus, by providing traveling waves and/or other surface deformations on the aircraft, the slipstream may be advantageously affected which may in turn allow for a decrease in the minimum aircraft separation distance and in turn lead to increases in airport efficiency.

Figure 5:
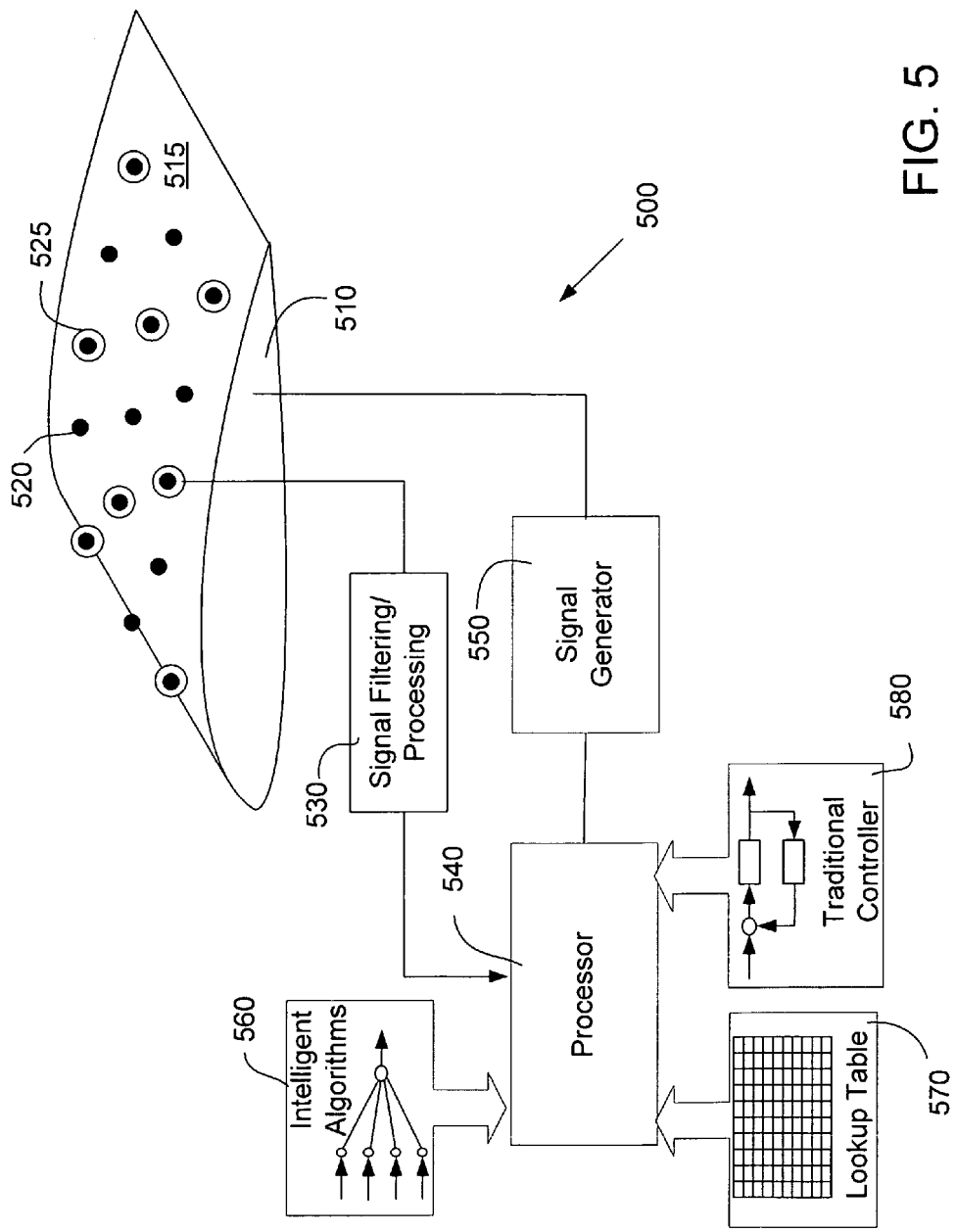
FIG. 5 is an exemplary block diagram of a drag control system using an active skin.

Referring now to FIG. 5, a generalized system 500 for altering the drag on an object is depicted. System 500 is depicted with an object 510 having a surface 515 with one or more actuators 520 and one or more sensors 525 associated therewith and distributed about surface 515. In an exemplary embodiment, actuators 520 and sensors 525 may be distributed on surface 515, within the material of surface 515, and/or under surface 515. Further sensors 525 may be located at positions which are not adjacent surface 515. Sensors 525 may be any of a variety of sensors, including but not limited to one or more of pressure sensors, temperature sensors, turbulence sensors, strain sensors, acceleration sensors, location sensors, attitude sensors, vibration sensors, speed sensors, etc. Further, sensors 525 or other sensors associated with the body may be used to monitor one or more accelerations, velocities, positions, orientations, angular rates, and angular accelerations. Sensors 525 may measure various physical states of the body and or states of the environment adjacent the body, for example, the physical states may include relative fluid velocity of the body, frequency of vibration of at least a portion of the body, amplitude of vibration of at least a portion of the body, location of the body, fluid pressure of the fluid at at least one location on the body, fluid pressure of the fluid at at least one location adjacent the body, temperature at at least one location of the body, temperature of the fluid at at least one location on the body, temperature of the fluid at at least one location adjacent the body, acceleration of at least one location of the body, etc. Sensors 525 provide a sensor signal to a signal filtering and signal processing system 530. System 530 may include any of a variety of filtering devices including, but not limited to estimation algorithms and circuits, filtering algorithms and circuits (low-pass, high-pass, bandpass, etc.), limiting circuits, etc. System 530 may also include any of a variety of signal processing systems, including but not limited to analog signal processor circuits, digital signal processing circuits and algorithms, etc. A signal from signal filtering and signal processing system 530 is communicated to a processor 540. Processor 540 may be any of a variety of processing devices including but not limited to microprocessors, application specific integrated circuits (ASICs), field programmable gate arrays (FPGAs), etc. Processor 540 may use the conditioned sensor signals to generate an actuator signal by signal generator 550 to be communicated to actuators 520. Processor 540 may implement any of a variety or combination of applicable control algorithms, including but not limited to intelligent algorithms 560 (artificial intelligence, fuzzy control, neural networks, genetic algorithms, stochastic optimization based control, etc.), lookup tables 570, traditional controllers 580 (classical controllers, multivariable controllers, optimal controllers, etc.), etc. Utilizing system 500, a traveling surface wave, a stationary surface wave, one or more dynamic surface deformations, or one or more surface displacements may be created on surface 515. In doing so, the air flow or other fluid flow over surface 515 may be affected to alter the drag on object 510 as discussed above. By altering the skin friction on a body surface in a predictable manner, it is then possible to control motions of the body due to the generation of different aerodynamic forces on different surfaces of the body.

Figure 6:
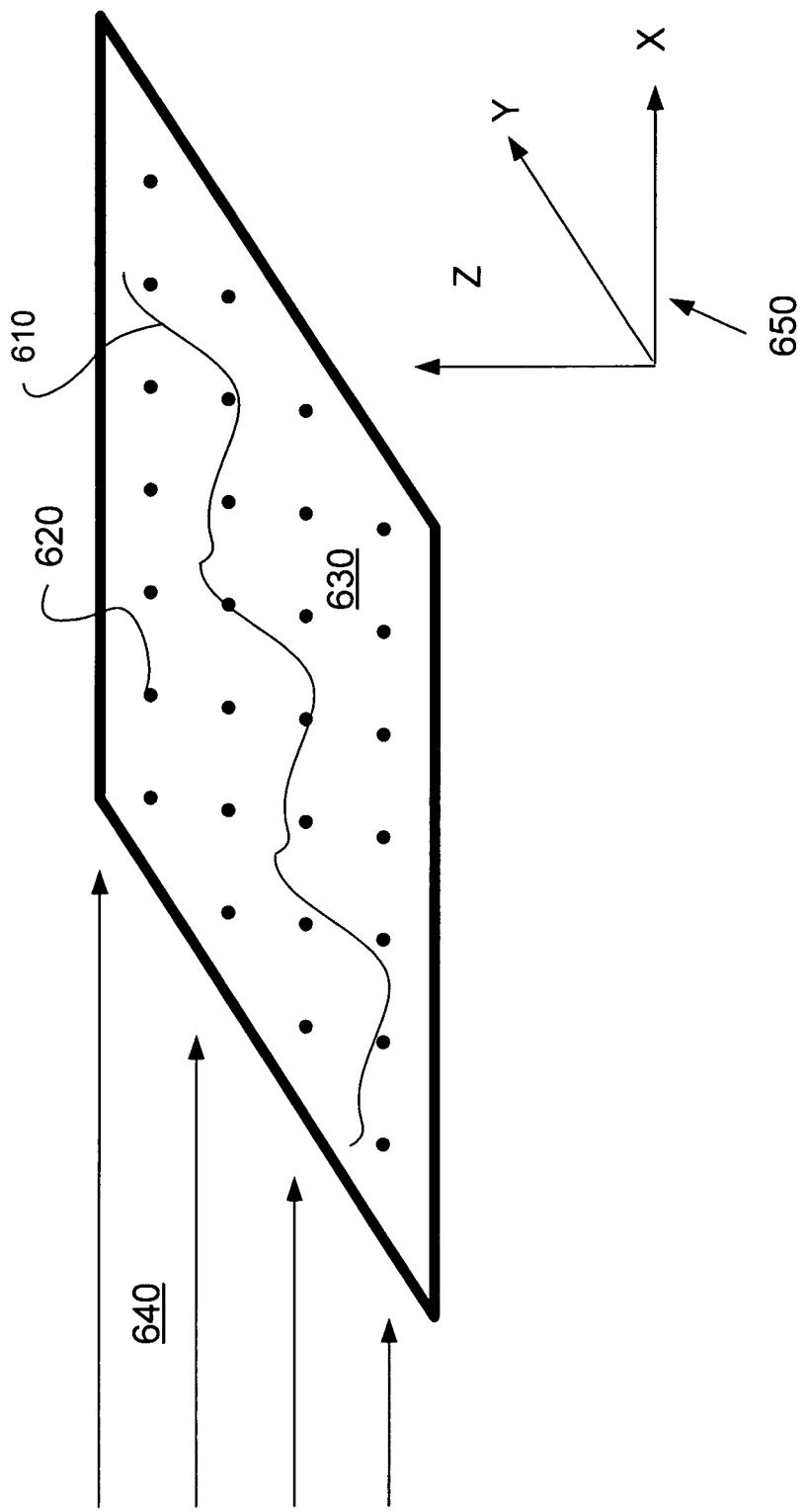
FIG. 6 is an exemplary block diagram of a traveling surface wave in the presence of a fluid flow.

For example, with reference to FIG. 6, a traveling surface wave 610 may be created by actuators 620 associated with a surface 630 in the presence of a fluid flow 640. As can be seen in reference to orthogonal axes (X, Y, Z) 650 the wave may proceed in a single direction (e.g. X) or in at least two orthogonal directions (X,Y) and may displace the surface in a third direction (Z). Wave 610 may be a simple surface wave such as a sinusoidal wave or may be any other type of wave, including but not limited to a superposition of sinusoids, which, as is well know in the art through Fourier theory, may be used to generate any type of periodic waveform. Further, waveform 610 may be aperiodic or damped, or may comprise numerous surface displacements and/or deformations. Any of a variety of signal processing and analysis techniques may be applied in order to generate the required waveforms, including but not limited to Fourier transforms, fast Fourier transforms (FFTs), wavelet transforms, and the like. Because it is only in rare circumstances that the velocity vector of the relative wind would be only in the X direction, it may be desirable to create traveling surface waves which travel in at least the X and Y directions. Also, because turbulence may be chaotic in nature, it may be desirable to have traveling surface waves that move in at least the X and Y directions in an attempt to cancel at least some of the turbulence. Further, it may be desirable to have traveling surface waves which propagate in at least the X and Y directions in order to control the directional forces on the body due to skin drag. This may be used for control and/or steering of the body. Alternatively, in order to produce control and/or steering of the body, it may not be necessary to propagate waves in both the X and Y directions, for example. Rather, it may be desirable to generate different skin friction vectors on different body surfaces of the body.

Figure 7A:
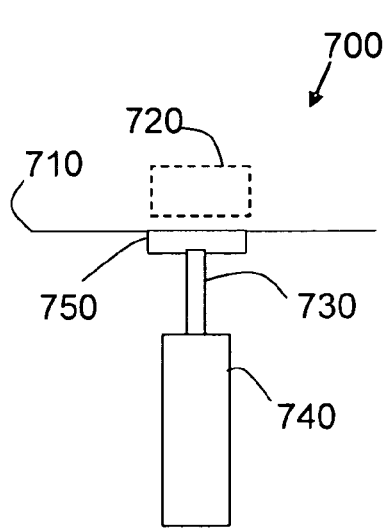
FIG. 7A is an exemplary diagram of an active skin surface having an air element above the skin surface.
Figure 7B:
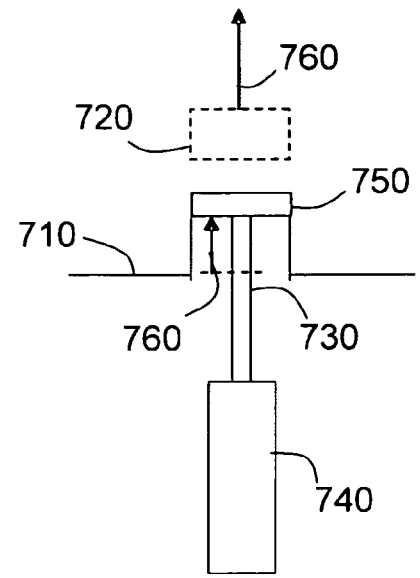
FIG. 7B is an exemplary diagram of the active skin surface of FIG. 7A having the air element displaced above the skin surface.

Referring now to FIG. 7A, an actuatorable system 700 is depicted. System 700 comprises an actuatorable surface 710 that can be deformed and/or displaced by an actuator 740 by movement of an actuator arm 730, that is associated with surface 710 via an actuator connector 750. An exemplary air volume element 720 above the actuator 740 moves if the surface is deformed, as depicted in FIG. 7B. The deformation of surface 710, by extending a distance 760, is caused by extending actuator arm 730 from actuator 740. Air volume element 720 may move perpendicular to the surface or may have the effect of compressing the air above actuator 740. Perpendicular movement may add perpendicular velocity 760 to the fluid flow. By making sequential deformations of this type across a surface, it may be possible to create a traveling wave across the surface which induces increased flow velocity adjacent the surface. By doing so, skin friction drag may be controlled and potentially reduced. In an exemplary embodiment, the movement of the surface may help to change the location of the onset of turbulence leading to an alteration in drag forces. In another exemplary embodiment, the surface deformations may create an apparent motion of the surface relative to the fluid thereby altering the skin friction drag which is related to relative wind velocity. Further, surface deformations may provide energy to the fluid flow which aids the fluid's movement along the surface thereby altering the skin friction drag.

Figure 8A:
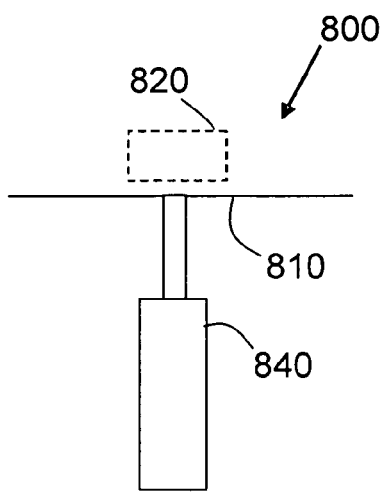
FIG. 8A is an exemplary diagram of an active skin surface having an air element above the skin surface.
Figure 8B:
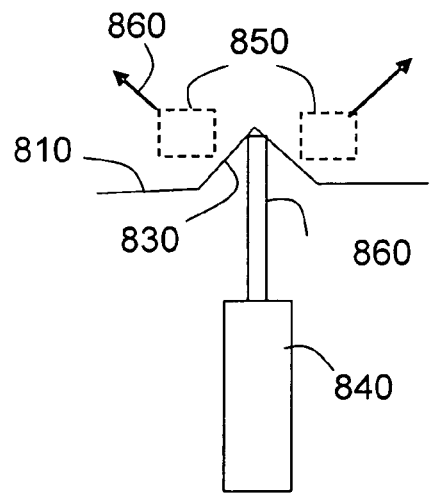
FIG. 8B is an exemplary diagram of the active skin surface of FIG. 8A having the air element displaced above the skin surface.

Referring now to FIG. 8A, an actuatorable system 800 is depicted. An actuatorable surface 810 may be deformed by an actuator 840. Air volume element 820 above actuator 840 moves if the surface is deformed. In accordance with the exemplary depiction in FIG. 8B, the deformation 830 of the surface 810 is caused by extending the actuator arm 860. At least a portion of air volume element 850 moves in a direction 870 perpendicular to the deformed surface 830. In this particular example a component of the velocity of a portion of air element 850 is horizontal to the undeformed surface. A horizontal velocity in the direction of the freestream may aid in reducing aerodynamic drag on the surface.

Figure 9B:
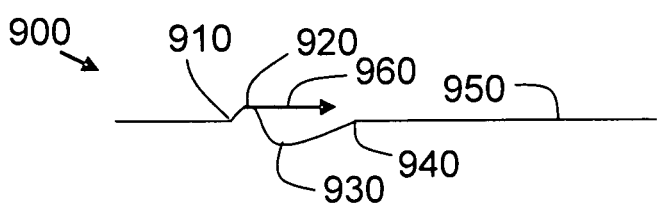
Figure 9C:
Figure 9D:
Figure 9E:
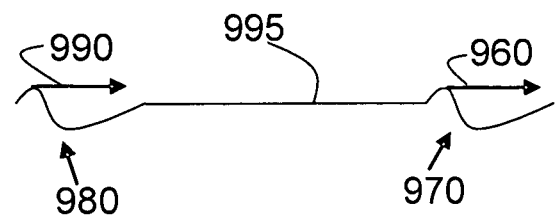

Referring now to FIGS. 9A-9E a flow manipulation system 900 in accordance with at least one exemplary embodiment is depicted. FIG. 9A illustrates a surface 950 in an unactuated state. FIG. 9B illustrates surface 950 in an actuated state in which surface 950 is deformed from the unactuated state. Surface 950 is deformed by one or more actuators forming a surface waveform, having a leading edge 910, a crest 920, a trough 930, and a trailing edge 940. The actuation is varied such that the waveform appears to travel at a velocity 960. Several waveforms 970, 980, separated by unactuated surface 995, may move with apparent velocities 990 and 960 respectively, moving air with, at a minimum, a component in the direction of the traveling waveform, thereby causing a reduction in drag.

In accordance with an alternative embodiment, surface 950 may be viewed as contacting another surface. For example the underside of surface 950 may be used to represent the bottom surface of a ski. As the underside of the ski is deformed with the travelling wave(s) depicted, a propulsive force, or braking force may be derived. Producing such propulsive and/or braking forces provides the ski (and any body attached to the ski) additional potential, for speed, braking ability, and/or control. Generally, it may be seen that the concept of deforming a surface by multiple surface deformations and/or traveling surface waves provides additional control to not only surface drag applications in which a solid/fluid interface exists, but also may be applied in solid/solid interface applications.

Figure 10:
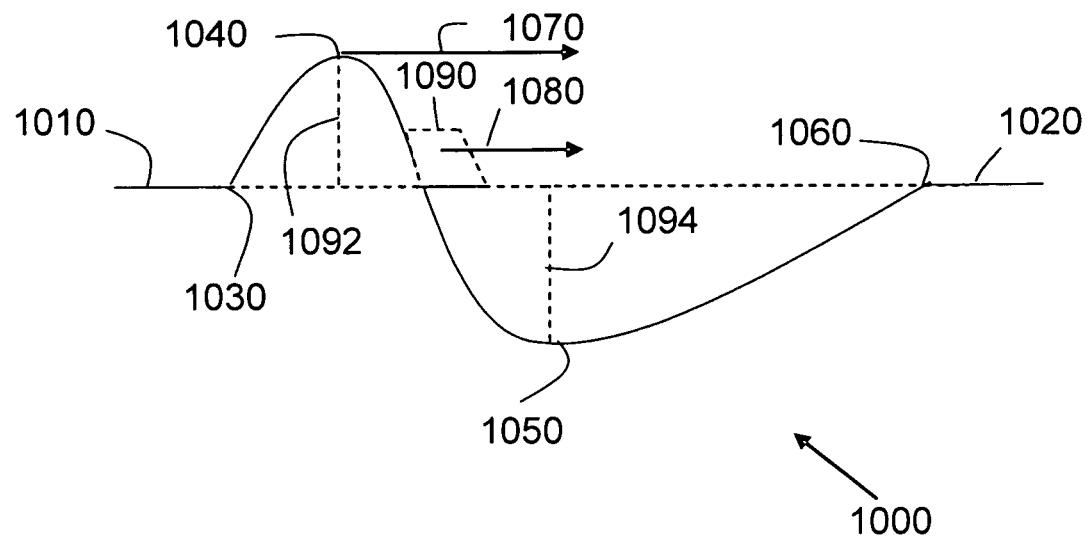
FIG. 10 is an exemplary embodiment of an exemplary waveform.

Referring now to FIG. 10 an exemplary waveform embodiment 1000 is depicted. A variation of actuation may result in waveform 1000, forming after the unactuated surface 1010 and before unactuated surface 1020. The waveform 1000 includes a leading edge 1030; a trailing edge 1060; a crest 1040; a trough 1050; a crest amplitude 1092; and a trough amplitude 1094. The variation in actuation appears to move the waveform at a horizontal velocity 1070, moving a region of fluid 1090 at a velocity 1080.

Figure 11:
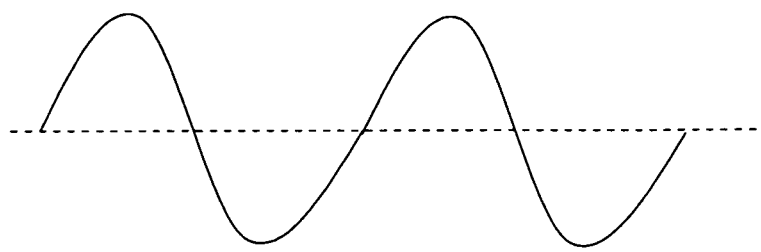
FIG. 11 is an exemplary diagram of an exemplary sinusoidal wave.

Many various waveforms in accordance with exemplary embodiments may be formed by a variety of actuations and actuation sequences, for example FIG. 11 illustrates a sinusoidal waveform formed by actuation in accordance with at least one exemplary embodiment. It may be desirable to form other complex waveforms, that are not strictly sinusoidal. Such other waveforms may be formed from a superposition of sinusoidal waveforms having varied amplitudes, frequencies, and phase shifts.

Figure 12:
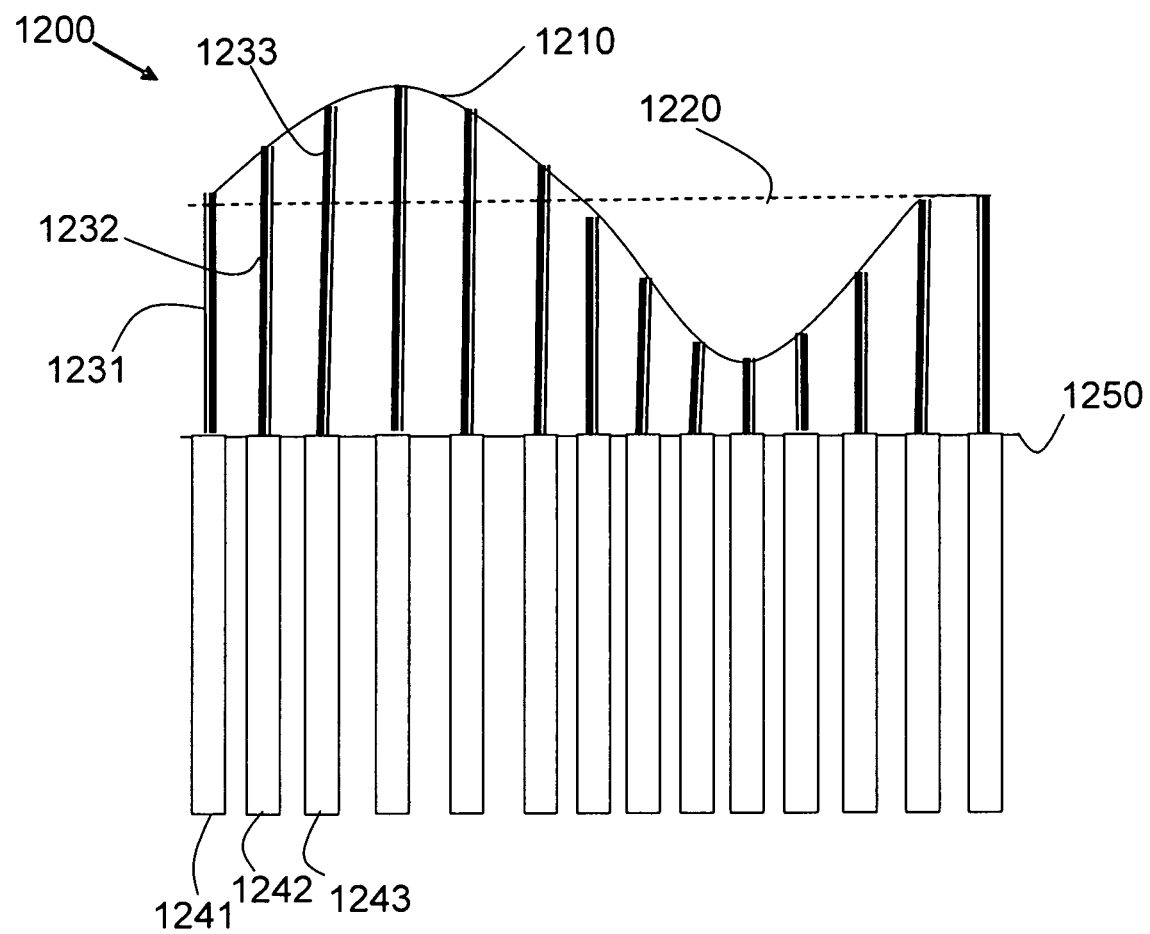
FIG. 12 is an exemplary diagram of an actuator system for an active skin system.

Referring now to FIG. 12 a flow manipulation system 1200 forming a waveform in accordance with at least one exemplary embodiment is depicted. A surface 1210 may be deformed with respect to an unactuated reference position 1220. For example actuator arms 1231, 1232, and 1233 can respectively be extended away from a reference face 1250 of the actuators 1241, 1242, and 1243 forming a portion of the deformed surface 1210. System 1200 depicts actuators having an extendable arm, such as but not limited to hydraulic actuators, electromechanical actuators, inductive actuators, and the like. However, other types of actuators may be equally applicable without departing from the scope of the claims. For example, the actuators may include but are not limited to micro electromechanical systems (MEMS) actuators, electroactive polymers, piezoelectric transducers, acoustic transducers, magnetic transducers, etc.

Figure 13:
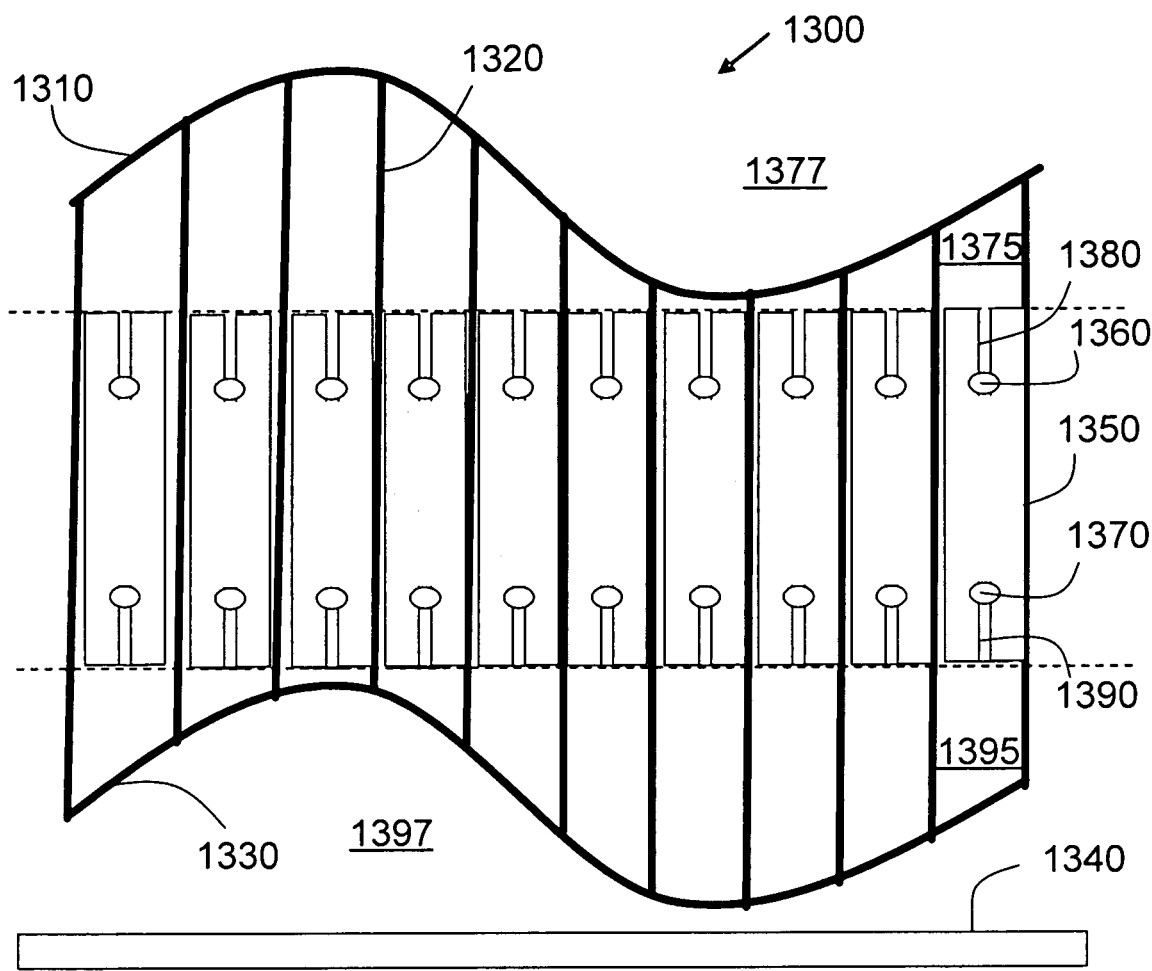
FIG. 13 is an exemplary diagram of an actuator system for an active skin system.

Referring now to FIG. 13, a flow manipulation system 1300 is depicted forming a waveform 1310 in accordance with at least one exemplary embodiment. Waveform 1310, in this example, is created by pressure differences between opposing regions 1375 and 1395. The pressure is supplied by intake ports 1360 and 1370. The medium supplying the pressure travels through channels 1380 and 1390 into regions 1375 and 1395 respectively. In the example shown the surface of a device has at least two layers 1350 and 1340. A flexible first surface 1310, adjacent to the freestream 1377 is connected to another flexible second surface 1330, by partition 1320. The region between partitions is referred to as chambers. The second surface 1330 is adjacent to a region 1397 lying between the first 1350 and second 1340 layers. By varying the pressures in neighboring chambers, deflections occur forming the shaped first surface 1310. By varying the pressures in a determined manner the waveform can be moved creating a horizontal velocity component reducing the drag.

Figure 14:
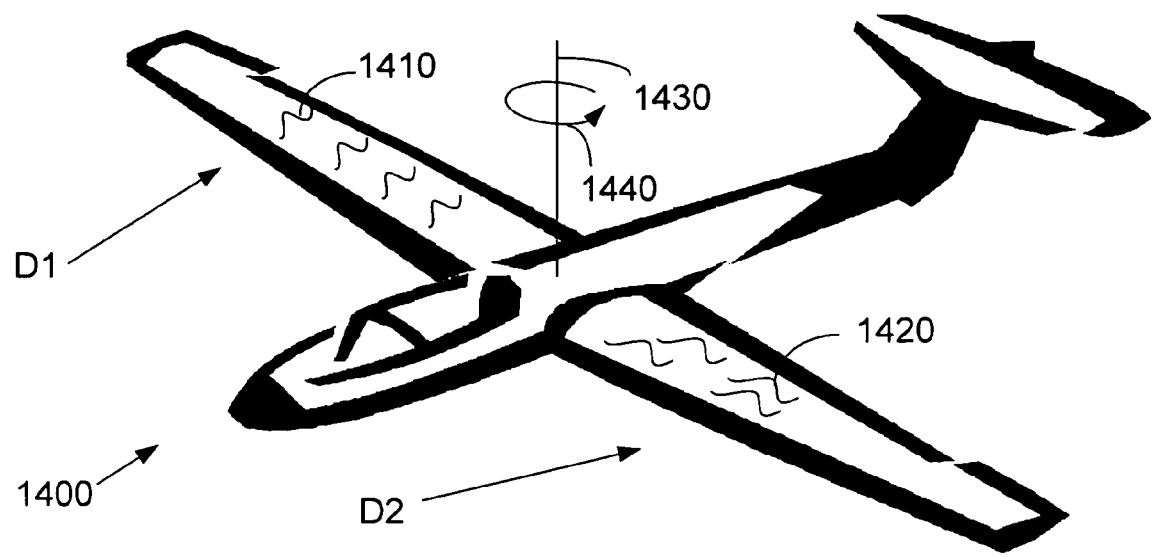
FIG. 14 is an exemplary diagram of different surface waves on different surfaces of a vehicle body.

Referring now to FIG. 14, an aircraft 1400 is depicted. Air flows around aircraft 1400 as aircraft 1400 is propelled through the air (or on the ground or water). Surface waves 1410 are created on a first wing surface by a controller associated with the aircraft. Surface waves 1420, which differ from surface waves 1410 are generated on a second wing surface of the aircraft. Because the different surface waves 1410 and 1420, different drag forces, depicted as drag force vector D1 and drag force vector D2, are created which cause a torque 1440 about an axis 1430. Torque 1440 may be desired in order to steer aircraft 1400 and/or cancel the effect of crosswinds or other disturbances. Although FIG. 14 depicts an aircraft any of a number of bodies may employ the differential force generation technique as discussed with regard to aircraft 1400. Such bodies include but are not limited to aircraft, watercraft, landcraft, spacecraft, etc.

Figure 15:
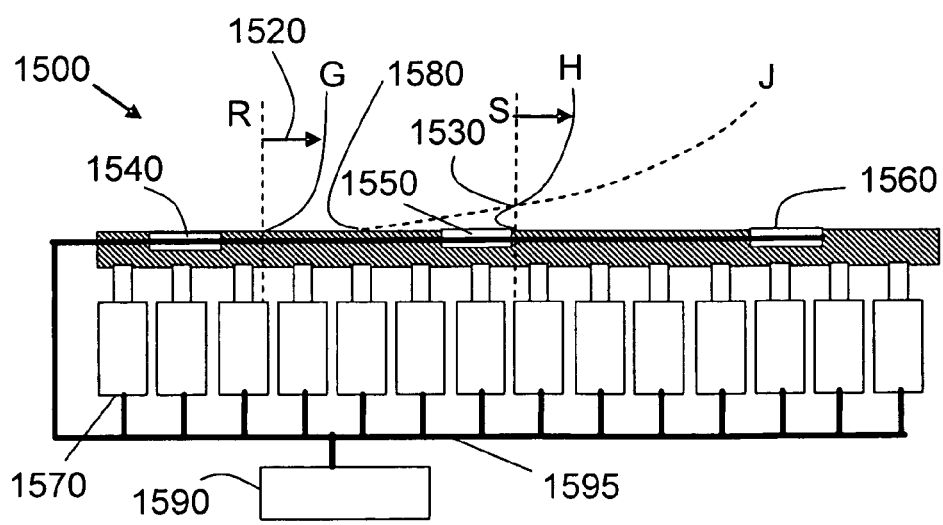
FIG. 15 is an exemplary diagram of an active skin system having flow sensors associated therewith.

Referring now to FIG. 15, at least one exemplary embodiment of a flow manipulation system 1500 having sensors 1540, 1550, and 1560 (e.g. pressure sensors, temperature sensors, and other flow characteristic measuring sensors as known by one of ordinary skill) is depicted. FIG. 15 depicts two velocity profiles G and H along a surface. The zero velocity reference lines are R and S respectively. Line J represents the zero velocity line, which occurs at two positions in velocity profile H, one at the wall and the other 1530 away from the wall, a characteristic of flow separation. The separation point 1580, is the point along the surface where the zero velocity line J leaves the surface. Separation increases drag, which can be reduced by flow manipulation via actuators 1570, which can be used to add velocity parallel to the surface altering the separation point. The actuators can be controlled by a microprocessor 1590, which can receive data from the sensors 1540, 1550, and 1560 via data lines 1595.

Referring now to FIG. 16, an exemplary embodiment of an active skin system 1600 is depicted. Active skin system 1600 comprises a first layer comprising a ferric material layer 1610. Ferric material layer 1610 is configured to be flexible and may be a continuous or semi-continuous layer of ferric paint, or may comprise ferric elements or further may comprise any layer having magnetic or magnetically attractive material. An elastic layer may be disposed below ferric material layer 1610, which may comprise an array of springs, or may comprise an elastic material having some spring constant, or may be some other configuration producing an elastic layer. A solenoid layer 1630 is disposed below elastic layer 1620. Solenoid laye 1630 may comprise an array of devices having a mechanism to produce a magnetic field. In one embodiment, solenoid layer 1630 comprises an array of solenoids 1632. Layers 1610, 1620, and 1630 are configured in such a way that changing parameters in the layer 1630 causes a deflection in layer 1610. For example, in the exemplary embodiment depicted where layer 1630 comprises an array of solenoids 1635 and layer 1610 comprises ferric paint, applying a voltage across one of the solenoids produces a magnetic field that will deflect the first layer in a direction depending on the direction of the magnetic field produced by the solenoid.

In order to control the layers 1610, 1620, and 1630, with an acoustic wave, a piezoelectric layer 1640 may be added. Piezoelectric layer 1640 comprises piezoelectric materials and is configured such that an acoustic wave can propagate in the layer. The acoustic wave causes a deflection in piezoelectric layer 1640 as it propagates through the layer, causing a deformation of the piezoelectric material, which in turn causes a voltage difference across the layer. This voltage is applied to the solenoid, and creates the deflection in the active skin as described above.

Referring now to FIG. 17, another exemplary embodiment of an active skin system 1700 is depicted. System 1700 comprises flexible membrane layer 1710 that is configured to be flexible. A response layer 1720 comprises a material that changes shape in response to an applied voltage and/or temperature, such as a piezoelectric material or nitinol (Nickel Titanium Naval Ordnance Laboratory) material which is a family of intermetallic materials, which contain a nearly equal mixture of nickel (55 wt. %) and titanium, or other shape memory materials. A piezoelectric layer 1730 comprises piezoelectric materials and is configured such that an acoustic wave can propagate in the layer. A propagating acoustic wave causes a deflection in the fourth layer as it propagates down the layer, causing a deformation of the piezoelectric material, which causes a voltage difference across the layer. This voltage is applied to the solenoid, and creates the deflection in the active skin system 1700 as described above.

Figure 18:
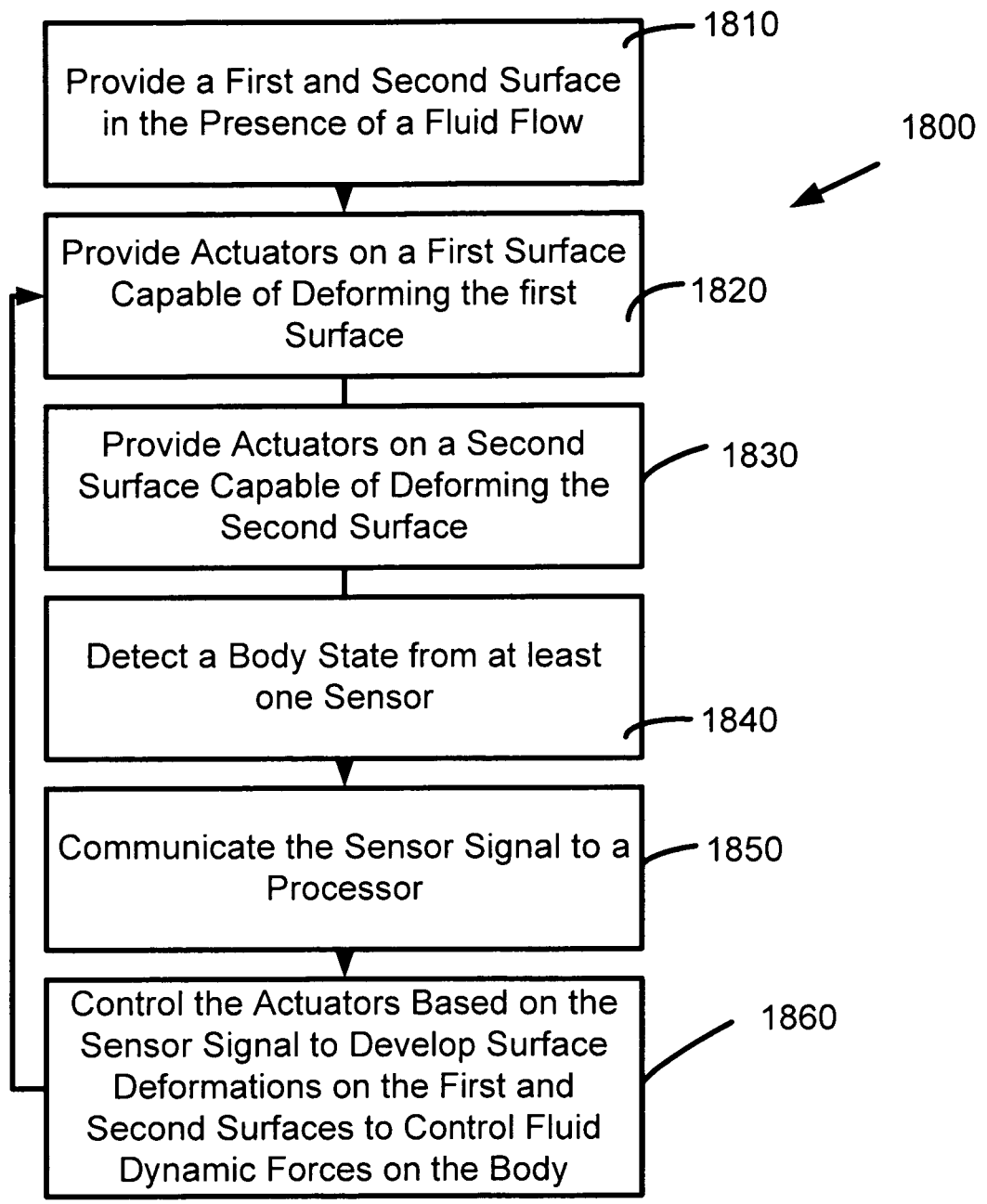
FIG. 18 is another exemplary process diagram of a surface deformation method.

Referring now to FIG. 18, a method 1800 of altering fluid flow about a surface is depicted. Method 1900 includes providing a first surface and a second surface in the presence of a fluid flow (process 1810). In association with the first and second surfaces, actuators are provided that are capable of deforming the surfaces independently of one another (processes 1820 and 1830). Such actuators may be but are not limited to any of a variety of actuators including electromechanical, hydraulic, MEMS, electroactive polymer, and the like. At least one body state, based on a signal from at least one sensor, is detected (process 1840). The body state may be any of a variety of characteristics which relating to the physical state of the fluid flow about the body or of the fluid flow affecting the state of the body or of the state of the body itself. The signal from the sensor is communicated to a processor (process 1850). The processor is configured to run an algorithm for controlling the actuators based on the sensor signal to create surface waves on the first and second surfaces to control fluid dynamic forces on the body. (process 1860) and thereby control steering or other force related states of the body.

Figure 19:
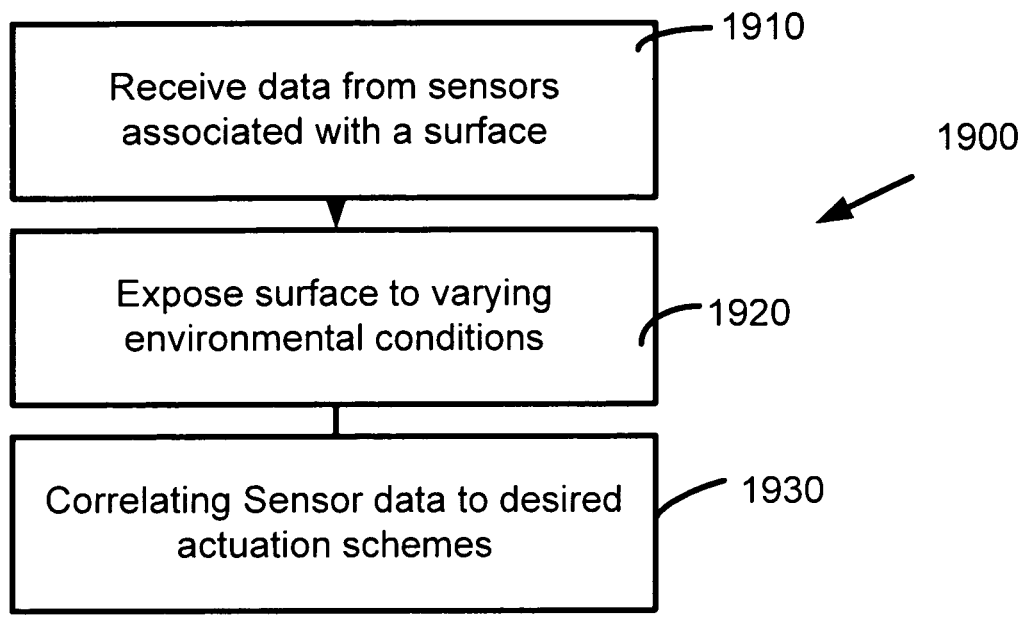
FIG. 19 is an exemplary process diagram of a control command determination method.

Referring now to FIG. 19, a process 1900 for empirically determining control commands or parameter changes for a surface deformation system is depicted. Control commands may include but are not limited to inputs to a controlsystem and the like, while parameter changes include but are not limited to changing control system parameters, settings, and the like. Process 1900 includes receiving data from sensors associated with a body and a surface of the body (process 1910). The surface has actuators for deforming the surface. Process 1900 also includes correlating the sensor data to desired actuation schemes (process 1930). The correlation may be carried out when the surface is exposed to varying environmental conditions (process 1920). Such varying environmental conditions may be conditions which vary over some predetermined range, preferably a range in which the body would conventionally be exposed (possibly with some safety factor) during actual operation.

Figure 20:
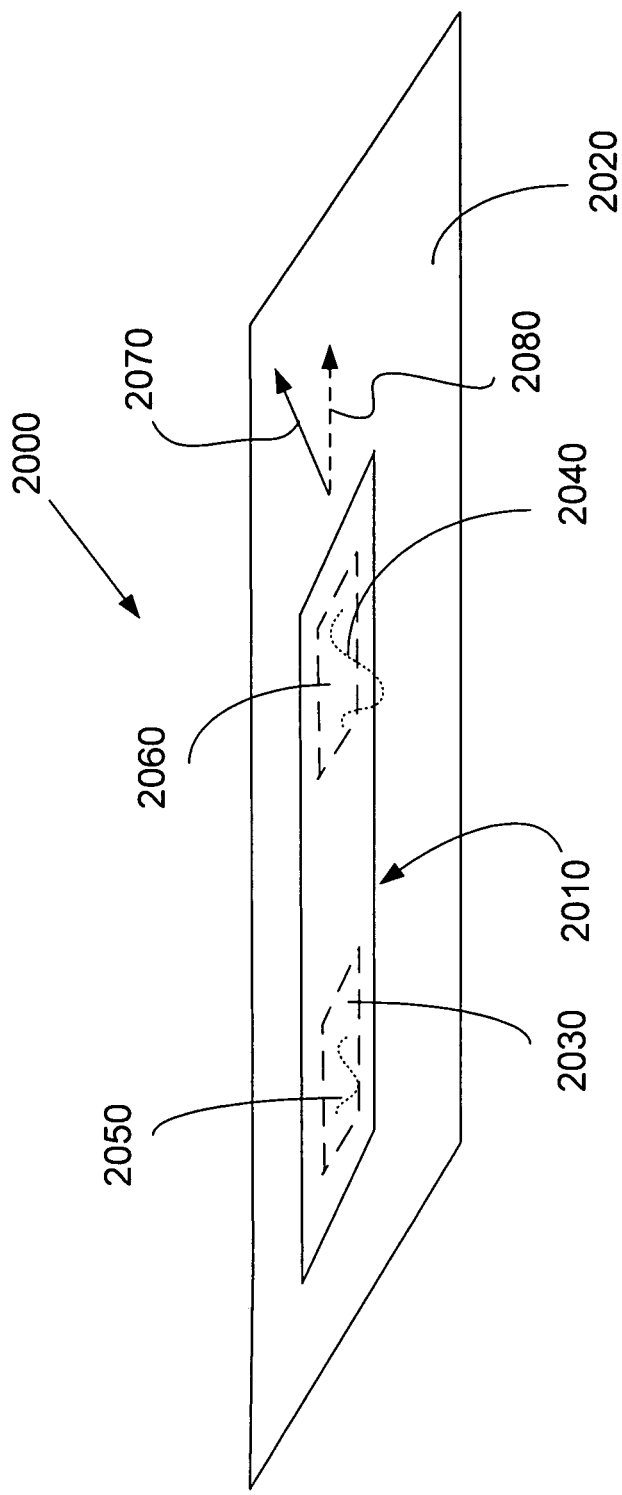
FIG. 20 is an exemplary diagram of a body having a surface to surface interface with different surface waves on different portions of the body.

Referring now to FIG. 20, an exemplary embodiment of a device 2000 having a bottom surface 2010 that interfaces with a ground surface 2020. Ground surface 2020 is representative of any of a variety of surfaces on which device 2010 may interface including but not limited to road surfaces, dirt surfaces, water surfaces, ice surfaces, snow surfaces, etc. Device 2000 may comprise various defined areas, for example device 2000 comprises defined area 2030 and defined area 2060. Areas 2030 and 2060 may be affected by actuators which are used to deform surface 2010 in and/or around the defined areas. For example, it is depicted that surface 2030 has a traveling wave 2050 and area 2060 has a different traveling wave 2040. It can be assumed that without such traveling waves device 2000 would be propelled in a relatively straight direction 2080, but by manipulating and causing different traveling waves 2040 and 2050, device 2000 may be steered in a direction 2070 deviating from direction 2070.

Figure 21:
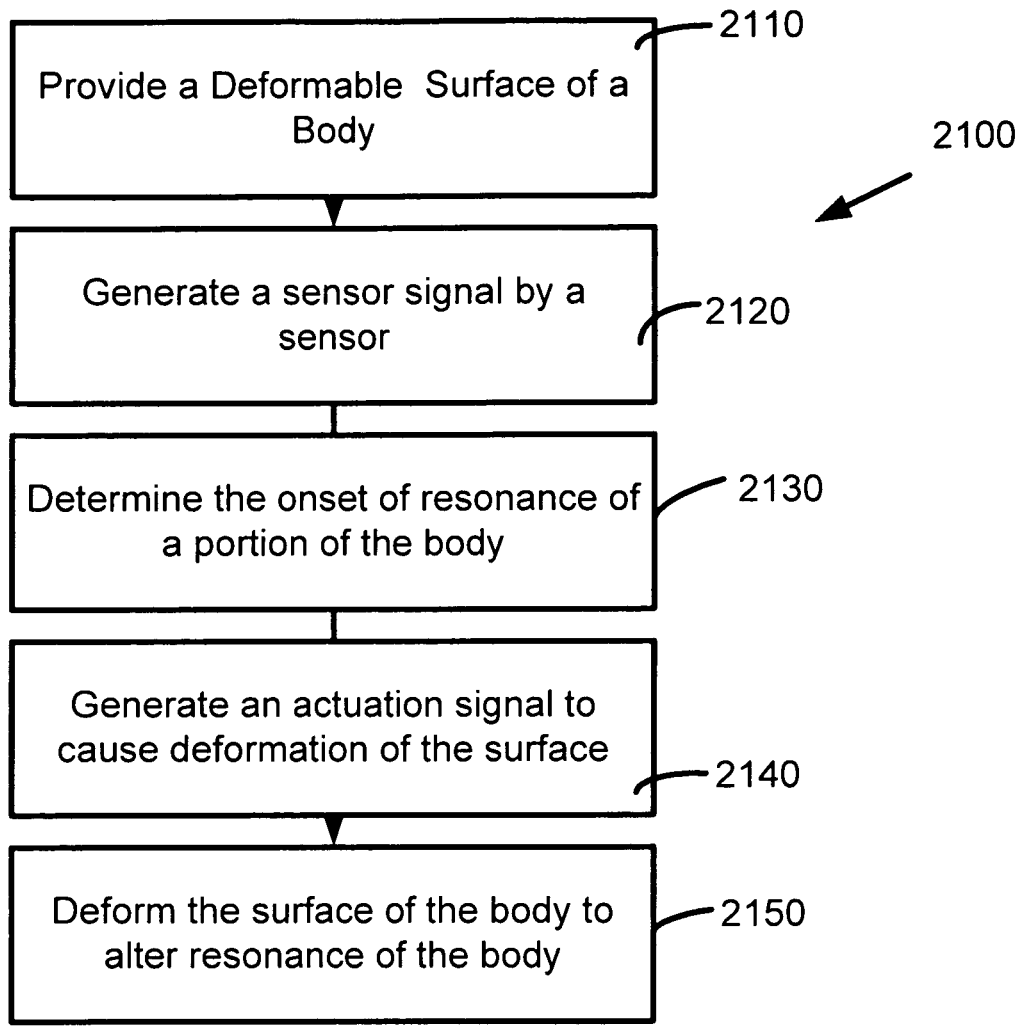
FIG. 21 is an exemplary process diagram of a method of controlling resonance of a body.

Referring now to FIG. 21, a process 2100 of controlling resonance of a body is depicted. Process 2100 includes providing at least one deformable surface of the body (process 2110). Process 2100 also includes generating a sensor signal by at least one sensor associated with the body (process 2120). Such a sensor signal may be generated from any of a variety of sensors on or near the body having some association with the body or the environment near the body. Once a sensor signal has been received an interpreted by a processing device, the onset of resonance of at least a portion of the body may be determined (process 2130). If the onset of resonance is detected, it may be desirable to prevent resonance, accordingly, an actuation signal is generated and communicated to actuators associated with the surface for selectively deforming the surface (process 2140). In response to the actuation, the surface of the body cancels or induces the resonance of the at least one portion of the body by changing forces on the surface of the body due to the deformation of the surface (process 2150).

In accordance with another exemplary embodiment applications may be made of active skin components for internal combustion engines. For example, internal combustion engines are typically used to generate vehicle thrust. One particular component of efficient combustion of an air/fuel mixture in an internal combustion engine is atomization of the fuel with the air. Since the fuel is mixed with the air at a time very close to the time of combustion, it is important that the atomization process occur quickly. Furthermore, turbulent airflows prior to combustion can disadvantageously cause the fuel to separate from the air. Thus, by controlling the turbulence characteristics of the fuel and/or air supply and atomization system, rapid atomization of fuel when mixed with the air that deters the fuel from separating from the air under turbulent conditions may be accomplished.

In accordance with another exemplary embodiment, applications may be made of active skin components for vehicle tires. For example, vehicle tires are conventionally used for vehicle thrust. The traction of the tire facilitates acceleration, braking and turning. Improved traction may be generated by greater contact area between the road surface and the tire surface. Improved traction may be desirable for vehicle braking and control. Alternatively, less traction may be generated by providing less contact area between the road surface and the tire surface. Decreased traction may be desirable during travel at high speeds in order to improve fuel efficiency. Therefore, by applying an active surface on the surface of a tire, the contact area of the tire may be selectively controlled in order to gain the desired performance.

In accordance with yet another exemplary embodiment, applications of active surface components may include improving pipe flow characteristics. Such control of active surfaces in pipes may be carried out using microfluidics, MEMS, etc. Such applications may include applications where a fluid is pumped through the pipe, drilling applications, medical applications, etc. In such an instance the inside surface may be controlled in order to alter the flow characteristics.

In yet another exemplary embodiment, water vessels (boats), airplanes, or other vehicles may benefit from an active skin. By controlling the active skin, fluid flow may be affected thereby controlling drag. By controlling drag, fuel efficiency may be improved, or control of the vehicle motions may also be controlled.

In yet still another exemplary embodiment, the active skin techniques described may be applied to clothing, for example for swimmers, cyclists, and other athletes, thereby producing better drag characteristics.

In still yet another exemplary application an active skin may be applied to snow skis or other skis in which you can increase and/or decrease drag to increase or decrease traction as desired.

Yet further exemplary applications are in the field of artillery, for example to decrease friction between the barrel and the projectile or the air and the projectile or on the sides of the projectile as it moves through the target. For example, a bullet equipped with microelectromechanical actuators to generate surface waves could be steered in mid-air.

Yet still another application may be a pump made of many small tubes to keep reynolds number low. In a laminar flow machine or pump, skin drag may predominate. Thus, flow characteristics through the tubes may be improved by providing traveling waves down the small tubes to decrease drag or to increase the fluid flow. Fluid will be slow at the point where it enters system and then accelerate down the length of the tubes, so the wave would have to similarly accelerate down the length of the tubes to keep the same relative wave.

Yet still in accordance with another exemplary embodiment, the traveling wave may, instead of matching the velocity of the fluid, have a velocity greater than that of the fluid. This would create a situation whereby the wave on the surface of the body would have excess acceleration to move the fluid out of the way. Further, if the traveling wave has vector and time components, the wave can be steered. In yet another embodiment, waves in the opposite direction from the previous viewpoint may be created to actively create traction or to pump fluids.

When implementing the active skin as described above, many methods to develop the desired fluid flow characteristics may be used. One such method is to generate the amplitude and the wavelength based on a variety of factors, one of which may be sensor output. In such an instance it may be desirable to form the peak amplitude of the wave having at least a mean-free path in the fluid flowing over the surface of the solid body to provide effective coupling between the fluid and the solid body. Practically, the amplitude may be many mean-free paths. Another consideration is the wavelength of the traveling wave, which may be a large multiple of the mean-free path.

In a general sense, those skilled in the art will recognize that the various embodiments described herein can be implemented, individually and/or collectively, by various types of electromechanical systems having a wide range of electrical components such as hardware, software, firmware, or virtually any combination thereof, and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for producing surface deformations on a surface of a body, comprising:
   a first surface being a surface of the body exposed to a fluid flow the first surface being defined by at least two orthogonal directions;
   at least one actuator affecting deformation of the first surface in at least two orthogonal directions;
   a control system providing control commands to the at least one actuator; and
   at least one sensor providing environmental characteristic information to the control system,
   wherein the at least one actuator is deposited onto the first surface.

* * * * *